United States Patent
Lane

(12) United States Patent (10) Patent No.: US 8,083,621 B1
Lane (45) Date of Patent: Dec. 27, 2011

(54) VARIABLE SPEED TRANSMISSION

(76) Inventor: Joseph C. Lane, Venetia, PA (US)

( * ) Notice: Subject to any disclaimer, the term of this patent is extended or adjusted under 35 U.S.C. 154(b) by 582 days.

(21) Appl. No.: 12/267,098

(22) Filed: Nov. 7, 2008

(51) Int. Cl.
*F16H 59/00* (2006.01)

(52) U.S. Cl. .......... 474/50; 474/52; 474/53; 474/70

(58) Field of Classification Search .......... 474/47–55, 474/56, 59, 64, 69, 70
See application file for complete search history.

(56) References Cited

U.S. PATENT DOCUMENTS

| | | | | |
|---|---|---|---|---|
| 4,024,772 A | * | 5/1977 | Kumm | 474/51 |
| 4,530,676 A | * | 7/1985 | Leonard | 474/49 |
| 4,591,351 A | * | 5/1986 | Kumm | 474/49 |
| 4,598,920 A | * | 7/1986 | Dutil et al. | 280/236 |
| 5,041,061 A | * | 8/1991 | Leonard | 474/52 |
| 5,104,357 A | * | 4/1992 | Leonard et al. | 474/49 |
| 5,443,423 A | * | 8/1995 | Ha | 474/47 |
| 5,637,046 A | * | 6/1997 | Ha | 474/53 |
| 5,830,093 A | * | 11/1998 | Yanay | 474/49 |
| 6,267,699 B1 | * | 7/2001 | Gruich et al. | 474/49 |
| 6,458,054 B1 | * | 10/2002 | Mimura | 474/100 |

* cited by examiner

*Primary Examiner* — Emmanuel M Marcelo
(74) *Attorney, Agent, or Firm* — John D. Gugliotta, PE, Esq.

(57) ABSTRACT

A multiple-ratio drive transmission comprises first and second spaced disc systems, each system of which is composed of three separate discs: (1) a retention disc located at an outermost side; a pin receiving disc located at an innermost side; and, (3) a pin holding disc sandwiched between. Each disc comprises concentric rings of proportionally spaced holes through which corresponding pins are maintained, inserted, retracted, or traversed. As the disc system rotates, each pin on a ring associated for a selected gear passes through a shifting zone in which a ramp mechanism is inserted. A plurality of selection cams rotates to urge a sequential outward deflection of cams. By rotating the selection cam, sequential deflection cams extend into the drive position; they urge a pivoting of a select deflection ramp. The ramp for the pre-selected gear ratio causes the ring to extend to the drive position. As the pins lift, the chain impinges and the gear ratio completely changes during one revolution. All other pins not engaged in the chain slot are held in a neutral or a retracted position by the retention disc.

25 Claims, 5 Drawing Sheets

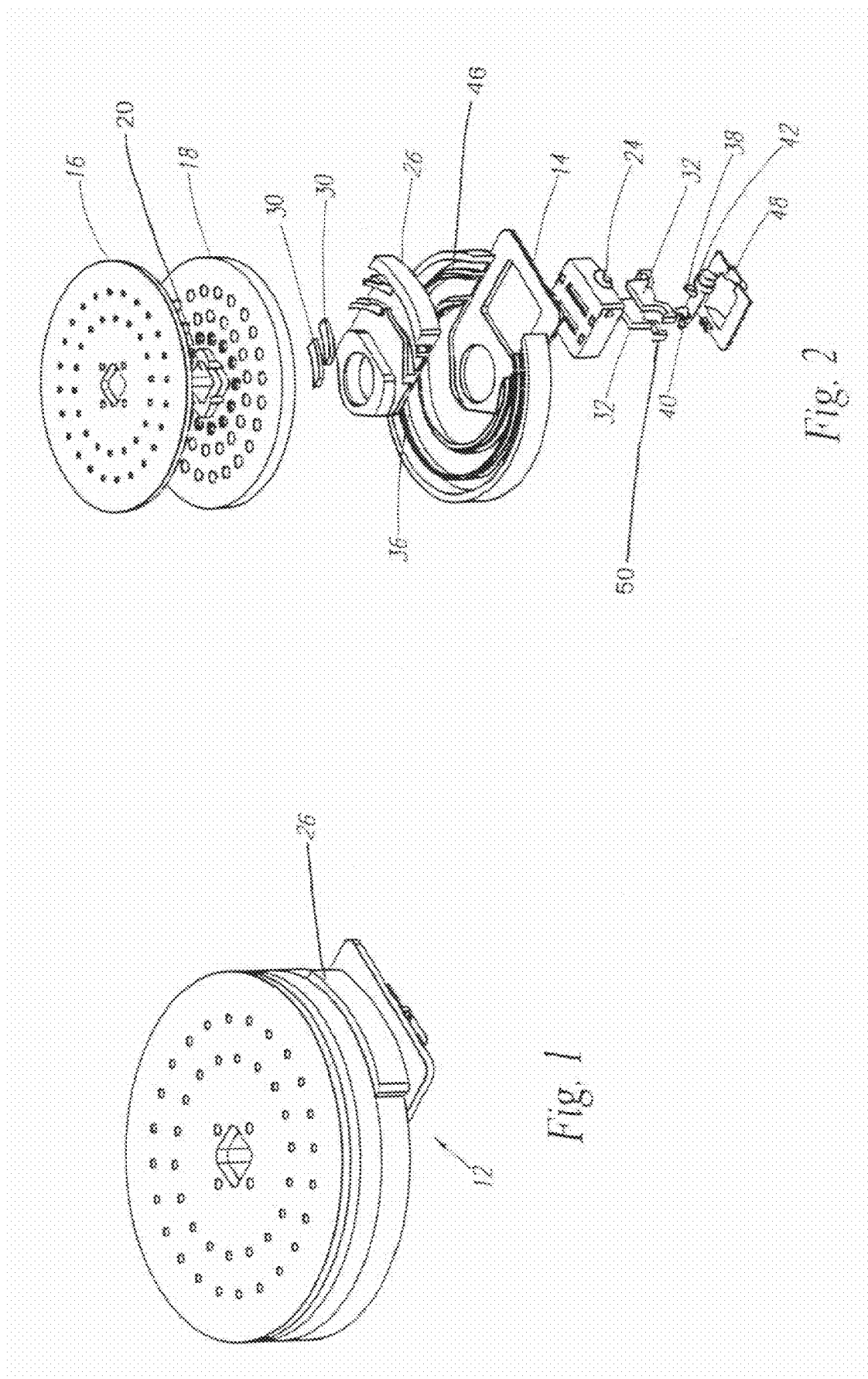

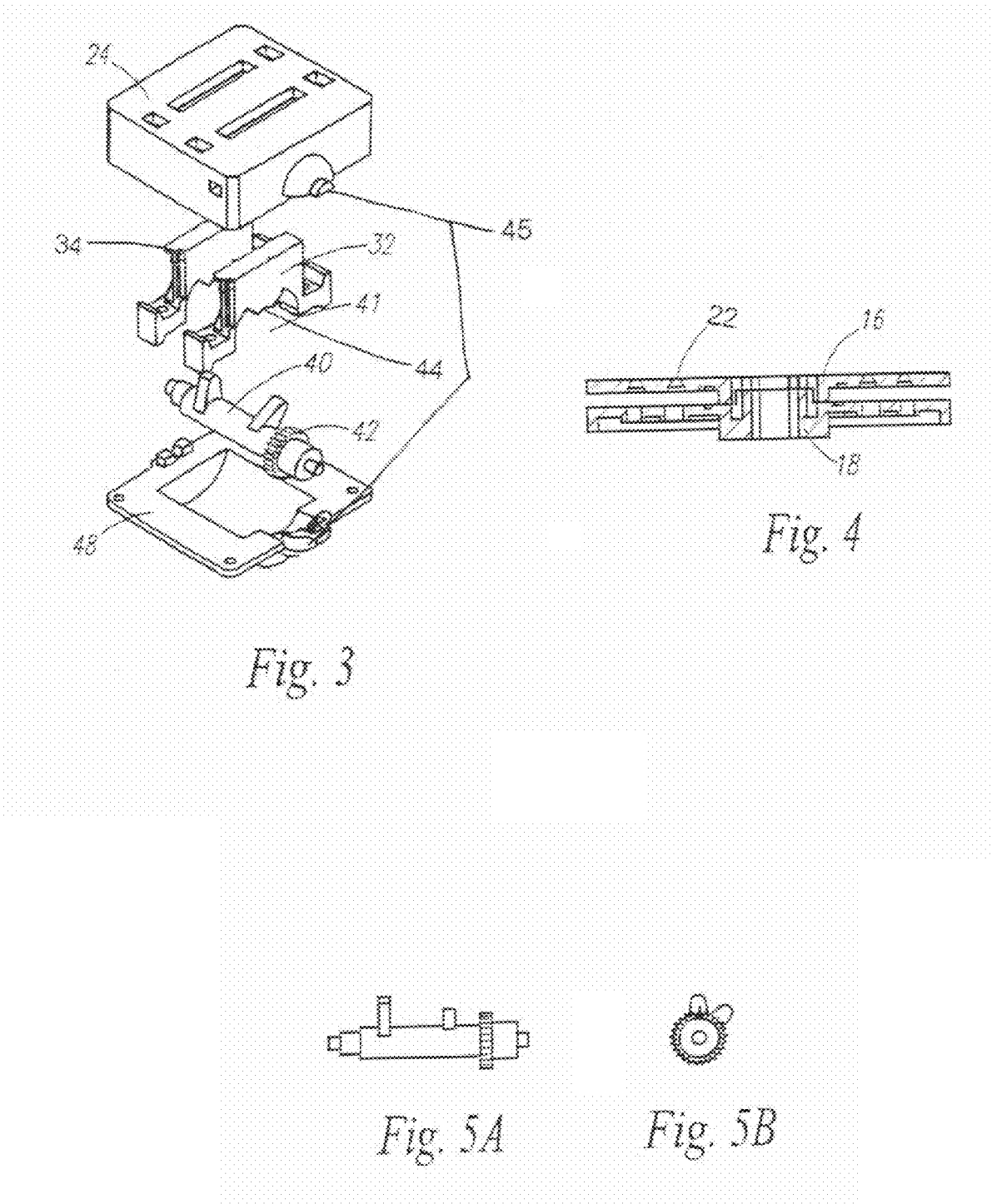

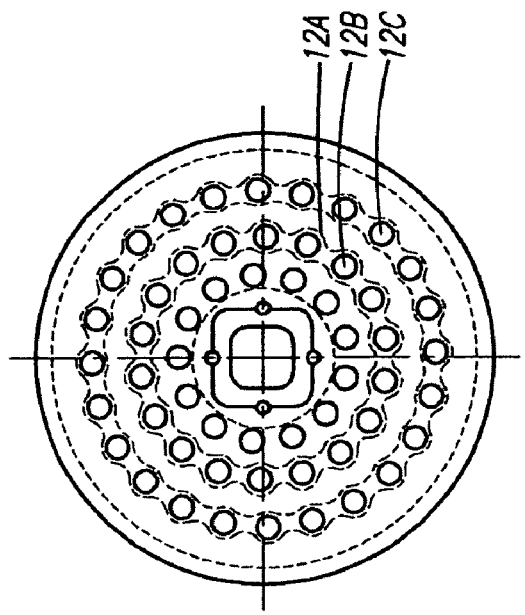
Fig. 6B
Fig. 7B
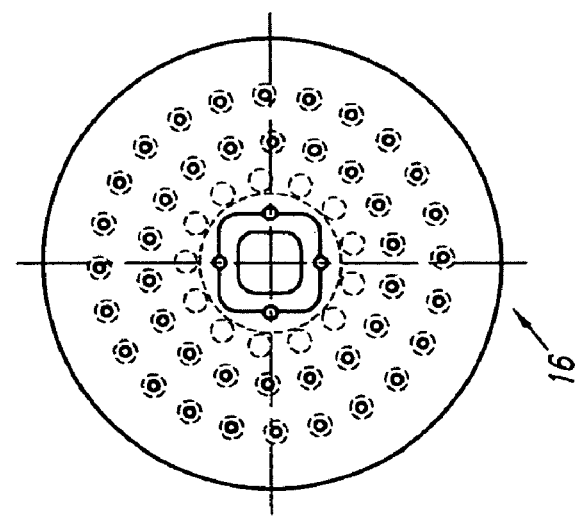
Fig. 6A
Fig. 7A

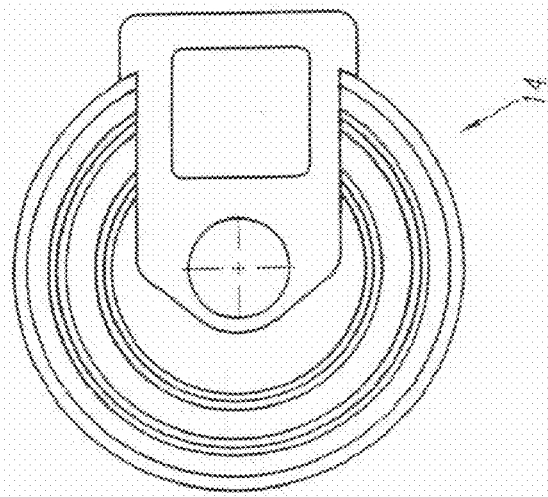
Fig. 6C
Fig. 7C
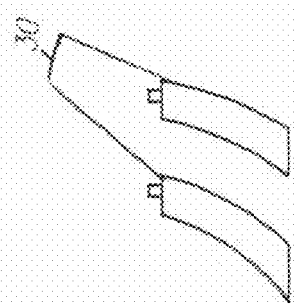
Fig. 8
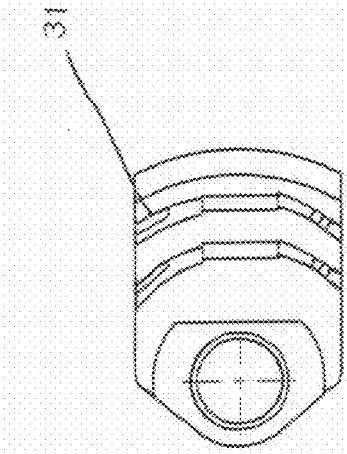
Fig. 9
Fig. 10

VARIABLE SPEED TRANSMISSION

RELATED APPLICATIONS

The present application incorporates subject matter first disclosed in U.S. Ser. No. 10/301,906, filed Nov. 22, 2002, which was a Continuation-in-Part of U.S. Ser. No. 09/620,184, filed Nov. 12, 1999. The present application incorporates subject matters of the now-abandoned '906 and '184 patents as if they are fully rewritten herein.

BACKGROUND OF THE INVENTION

1. Field of the Invention

The present invention relates generally to variable speed transmissions and, more particularly, to a novel pin configuration and shifting arrangement for variable speed transmissions that utilize rings of shifting pins to vary drive ratios.

2. Description of the Related Art

Roughly 100 million bicycles are produced each year worldwide, and a derailleur is a current means to move all of them. An alternative concept for a power-shifting transmission first appeared in the early 1980s, which used a number of magnets to shift between gears. A pin displacement system used the polarity of magnets to shuttle concentric rows of pins in and out of gear. Further developments steered systems away from magnets and towards plastic pins. In early models, a moveable displacement system engaged rows of concentric pins. When a rider shifted gears, a linear movement deflection cam slid into position to engage a specified row; however, this system fell short because it lacked the gear shifting speed necessary to prevent pin head decapitations. This shortfall is remedied in the present invention.

U.S. Ser. Nos. 10/301,901 and 09/620,184, to the present inventor, first introduced solutions to these problems. These applications are incorporated herein as if they are fully rewritten. Testing of the inventions practicing the foregoing applications revealed a number of practical problems associated with an impingement of head pins with the ramp mechanism. It was discovered that mechanical failures would occur if there was no smooth engagement with the rotating pins and the ramp mechanism.

The present invention consequently provides an improved apparatus and method having benefits and characteristics not previously disclosed. The present invention utilizes less complex technology, yet it is a more reliable mechanical mechanism for shift urging.

SUMMARY OF THE INVENTION

It is a primary object of this invention to provide a safer alternative to the common derailleur system that is at present almost exclusively used on bicycles. It is therefore an object to teach a variable-speed transmission of relatively simple construction.

It is an object of this invention to reduce noise caused by plastic strips in conventional transmissions. A deflection cam is modified to include a flange, which takes a place of bridging material in prior art transmissions.

It is a further object of this invention to minimize a movement of pins inside a transmission to decrease component wear and increase product life.

It is another object of this invention to modify internal mechanics so the bicycle is capable of back-pedaling. Ramps are modified to allow them to pivot.

It is yet an object of this invention to eliminate friction and wear of offset chain shifting, to eliminate a possibility of jamming while shifting, to prevent chain slippage, and to prevent the rear wheel from locking. It is anticipated that the foregoing objects are accomplished by keeping a drive chain of the bicycle captured between two discs in a single plane. The drive chain always moves in a single plane and it cannot be offset to either side during operation. Concentric rings of pins are rather utilized to shift between gears; hence, the chain cannot get caught between gear cogs because there is no side-to-side motion like that in a conventional derailleur.

It is an additional object to make the assembly aesthetically pleasing and very light weight. It is anticipated that at least most parts of the assembly are manufactured from Derlin, a high quality material that both is light weight and has a very low coefficient of friction, so that the transmission is self-lubricating and requires very little maintenance.

It is a further object that the top and bottom gears of the present transmission assembly are higher and lower, respectively, than those of any derailleur system. This object results in a greater range of options for any bicyclist using transmission. Bicyclists have greater riding options available such that their bicycles are more capable of tracking hills and straightaways on a variety of courses.

It is another object to completely enclose the transmission and chain assembly to prevent any debris from entering and jamming the mechanics.

It is a final object of this invention to quicken shiftings of the transmission. A ¼-inch turn of the bicyclists' wrist causes cams inside the transmission to change gears. The present furthermore makes it not necessary to shift whilst in motion; the bicyclist can change gears while stopped.

It is anticipated that when a twist grip shifter is turned, it simultaneously rotates a cam shaft that engages a deflection cam corresponding to a specified gear. The deflection cam subsequently pushes in pins for that gear; the transmission will change gear in one revolution of the pedals. Pin heads are constantly shuttled through bridging. The bridging is a thin strip of rigid plastic that bridges a gap across the shifting zone to keep pins in a neutral position until the deflection cam installs them into a drive position.

Briefly described according to a preferred embodiment of the present invention, a multiple-ratio drive transmission comprises first and second spaced disc systems, each system of which is composed of three separate discs: (1) a retention disc located at an outermost side; a pin receiving disc located at an innermost side; and, (3) a pin holding disc sandwiched between. Each disc comprises concentric rings of proportionally spaced holes through which corresponding pins are maintained, inserted, retracted, or traversed. As the disc system rotates, each pin on a ring associated for a selected gear passes through a shifting zone in which a ramp mechanism is inserted. A plurality of selection cams rotates to urge a sequential outward deflection of cams. By rotating the selection cam, sequential deflection cams extend into the drive position; they urge a pivoting of a select deflection ramp. The ramp for the pre-selected gear ratio causes the ring to extend to the drive position. As the pins lift, the chain impinges and the gear ratio completely Changes during one revolution. All other pins not engaged in the chain slot are held in a neutral or a retracted position by the retention disc.

BRIEF DESCRIPTION OF THE DRAWINGS

Advantages and features of the present invention are better understood with reference to the following, more detailed description and Claims, taken in conjunction with accompanying drawings, in which like elements are identified with like symbols, and in which:

FIG. 1 is a partial top-side elevational view of a variable speed transmission disc system according to the present invention;

FIG. 2 is an exploded view of a disc assembly on the variable speed transmission;

FIG. 3 is an exploded partial side view of the cam assembly;

FIG. 4 is a partial side view of the ramp assembly;

FIG. 5a is a side view of the shaft;

FIG. 5b is a front view of the shaft;

FIG. 6a is a top view of the pin-receiving disc;

FIG. 6b is a top view of the pin-holding disc;

FIG. 6c is a top view of the retention disc;

FIG. 7a is a side view of the pin-receiving disc;

FIG. 7b is a side view of the pin-holding disc;

FIG. 7c is a side view of the retention disc;

FIG. 8 is a partial side view of the deflection cam; and,

FIG. 9 is a partial top view of the deflection cam and lift ramp;

FIG. 10 is a side and top view of the deflection ramps.

DESCRIPTION OF THE PREFERRED EMBODIMENTS

Figure 11:
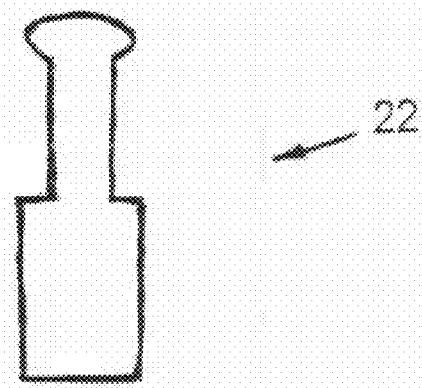
FIG. 11 is a front view of the mushroom-headed pin.
Figure 12:
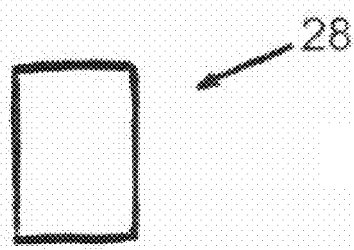
FIG. 12 is a front view of the barrel shaped pin.

FIGS. 1-7 represent a variable speed transmission 10 (hereinafter "transmission") according to a preferred embodiment of the present invention. The present transmission 10 is shown adapted for use on a bicycle; however, the teachings may be used for other applications which utilize variable speed drive ratios, s.a., e.g., for motorcycles, motor vehicles, and, powered mechanical equipment, etc.

This transmission 10 includes at least seven major components: (1) at least one pin disc system having a front pin disc and a rear pin disc; (2) a pin holding disc; (3) a pin receiving disc and ramp apparatus; (4) a cam assembly; (5) headed pins; (6) barrel pins; and, (7) a specifically adapted chain.

Greater detail is provided herein to functionality of the rear disc system; however, similar structures and features may be repeated for the front disc system. Modifications can be made to the systems of the front disc system without straying from teachings of this disclosure.

The rear pin disc system 12 comprises a set of discs 16, 18 with concentric rows of proportionally spaced holes. Mushroom-headed pins 22 are inserted into the holes to place the transmission 10 in the "drive" position, and they are retracted to place it in the neutral position. As the rear disc system 12 rotates, each mushroom-headed pin 22 passes through a shilling zone having a ramp mechanism 26 inserted therein. The ramp mechanism 26 is formed by a deflection cam housing 48 which retains a plurality of deflection cams 32. A rotating shaft 40 rotates to urge sequential deflection cams 32 outwards. A deflection cam housing cover 48 retains the assembled ramp mechanism 26. By rotating the selection shaft 40, deflection cams 32 extend into the drive position and urge a pivoting of a selected deflection ramp 30. The deflection ramp 30 causes the associated rows of pins 22 to insert to the drive position for pre-selected gear ratios. The chain (not shown) impinges as the pins 22 lift; the gear ratio completely changes during one revolution of the pedal. All the pins 22 not engaged in the chain slot are held in the neutral (synonymous to "retracted") position.

1. Detailed Description of the Figures

A front side elevational view of a rear disc system 12 on a transmission 10 is shown in FIG. 1. Teachings are a same essentially for both a front disc system and a rear disc system 12. The front disc system consists of three concentric rings of proportionally spaced holes. These rings represent the three drive ranges of a bicycle transmission. Similarly, the rear disc system 12 consists of up-to eight concentric rings 12A-12C of proportionally spaced holes; these rings represent the gearing of a bicycle transmission. When the front and the rear disc systems 12 are used in combination, a total of up-to twenty-four (24) different speed ranges are available. A supporting structure, such as a bicycle frame, holds the front and rear disc systems 12 in position. A chain (not shown) interconnects the front and rear disc systems 12 for purposes of transmitting mechanical power. For purposes of clarity, the chain engages the outermost ring of holes on both the front and rear disc systems 12. Both systems comprise a shifting zone, where an adjustment takes place for which the chain engages the transmission. The shifting zone consists of a shifting apparatus which is described in greater detail below.

FIG. 2 shows an exploded view of the rear disc system 12, which consists primarily of three circular plates: (1) a retention disc 14 (shown in FIGS. 6c, 7c) located at an outermost side; a pin receiving disc 16 (shown in FIGS. 6a, 7a) located at an innermost side; and, (3) a pin holding disc 18 (shown in FIGS. 6b, 7b) sandwiched between. A series of mechanical fasteners, such as screw or bolt fasteners, hold both the pin holding disc 18 and the pin receiving disc 16 in position. The retention disc 14 is static; hence, it neither rotates nor moves relative to the remainder disc system 12. The pin holding disc 18 and the pin receiving disc 16 form a stable and strong platform capable of handling torque transmitted by the transmission 10. A cavity retention slot 20 is formed between the pin holding disc 18 and the pin receiving disc 16 to prohibit a disengagement of the chain.

Each of the proportionally spaced holes is capable of holding its own respective mushroom-headed pin 22. A mushroom-headed pin 22 that is not engaged is interim stored in the retention disc 14 until it is called upon for deployment by a cam assembly 24 and a ramp apparatus 26. Because the retention disc 14 does not rotate, a series of retention T-rings (not shown) are provided in it to allow all retained pins to traverse through it. Because the chain must engage a row of pins 22 at all times, the innermost ring is permanently deployed using barrel shaped pins 28. The barrel shaped pins 28 are permanently inserted in the corresponding innermost ring holes on the pin receiving disc 16, even if an outward ring of proportionally spaced holes is simultaneously deployed.

Each concentric ring in the pin receiving disc 16 and the pin holding disc 18 comprises a greater number holes than the inner ring before it so that proportional spacing is maintain. In this respect, e.g., the innermost ring 12A includes thirteen (13) holes whilst each succeeding outwardly spaced ring includes additional holes; hence, the second ring 12B has eighteen (18) holes, the third ring 12C has twenty-four (24) holes, etc. This description applies equally to the rear disc system.

FIG. 3 shows an exploded view of the cam assembly 24 (and the ramp apparatus 26 in FIG. 4) between the retention disc 14 and the pin holding disc 18. A ring of mushroom-headed pins 22 are directed in an extended position (as shown in FIG. 4). No spring is required to hold the pins 22 because the retention disc 14 holds them in place.

The ramp apparatus 26 is shown in relationship to mushroom-headed pin(s) 22 as they move across the depicted surface. The ramp apparatus 26 is a mechanical device having no moving parts. The ramp apparatus 26 performs three functions: (1) secures heads of pins as discs are rotating; (2) taps pinheads down; and, (3) pushes repositioned pins to return them in the chain slot.

Firstly, a lift ramps 30 individually secures the head of each pin 22 as the discs 16, 18 are rotating. One concentric pin circle corresponds to one preselected gear ration. The pins 22 for the preselected gear ratio pass into a ramp opening. The mushroom-headed pins 22 on the associated ring are then lifted up the corresponding helical ramp, out the chain retention cavity slot 20, and then up to a neutral or a stowed elevation.

Secondly, a deflection cam 32 immediately taps the pinhead to return it to the drive ramp capture position. If the deflection cam 32 is rather rotated, the pin enters a transfer ledge 34 to a neutral position.

Finally, the drive ramp 30 pushes the repositioned pins back into the chain slot to thus complete a shifting cycle.

The cam assembly 24 is shown as a generally rectangular deflection cam cradle 36 provided with all other components contained therein. The cradle 36 is box-like in appearance. A series of seven pin deflection cams 32 are provided for an eight-speed transmission. These pin deflection cams 32 rest in a series of seven parallel slots. A cam shaft 40 is located over and in a perpendicular arrangement to the pin deflection cam 32. A side view of the shaft 40 is shown in FIG. 5a and a front view of the shaft is shown in FIG. 5b. The shaft 40 selects one of the seven pin deflection cams 32 to depress. Only one of the seven pin deflection cams 32 can be extended at one time. A gear selection means 42 is positioned at an end of the shaft 40. The gear selection means 42 provides for a connection of a shifter cable (not shown) to a handlebar or to a frame mounted shifter lever. The gear selection means should not be considered a limiting factor; rather, an electronically operated solenoid or another means can be utilized as well.

The cam shaft 40 engages a respective pin deflection cam 32. An engaged node 38 rides along a pair of bearing surfaces 43 comprised on the pin deflection cam 32. The node 38 rests in a placement groove 44 at a mid-point of a bearing surface 42. A first travel defines movement. The first travel allows for motion in both circular directions; upwards and downwards shifting is permitted. The action of the cam shaft 40 against the pin deflection cam 32 causes the latter to move downward. This downward movement is defined by a second travel. When they are not engaged, a pair of return springs 46, for each pin deflection cam 32, returns the latter to its retracted position. A cam assembly cover 48 provides physical protection for the moving interior components of the cam assembly 24. The cam shaft 40 is in a neutral or a retracted position. Return springs 46 aid this action.

The deflection cam 32 has a ledge 34 along a bottom edge to insure the pins 22 stay in the neutral position as they cross the gap over the shifting zone. When the deflection cam 32 lowers into the drive position, the ledge 34 also drops enabling enough clearance for the pins 22 to pass between the ledge 34 and the leaching edge of the drive ramp 31. This construction eliminates any noise that was previously caused by the pins being pushed through bridging: plastic strips kept the pins from unexpectedly flaiing through the open gap of the shifting zone. The deflection cam cradle 36 rests within the retention disc 14. The cam assembly cover 48 holds it captive, which is attached to the retention disc 14 around its perimeter. The series of seven pin deflection cams 32 are placed inside the deflection cam cradle 36, wherein they rest upon the retaining nodule 50 and the return spring 46. The cam shaft 40 is installed over the seven pin deflection cams 32; it rests upon their outward axial end. The cam assembly 24 installs over the outward side. This position allows the pin deflection cam 32 to protrude through the retention disc 14 and the ramp apparatus 30. The engagement position provides the pin deflection cam 32 access to the mushroom-headed pins 22.

The small, overall size and compact arrangement of the cam assembly 24 benefits the transmission 10 because weight and space considerations are of primary importance in variable speed drive designs. The earn assembly cover 48 and the deflection earn cradle 36 additionally form a substantial barrier which holds grease or other lubrication in the interior while keeping dirt and other environmental contaminants from it. The transmission is preferably manufactured by means of an injection molding process. It is anticipated that at least most parts of the assembly are manufactured from Derlin, a high quality material that both is light weight and has a very low coefficient of friction, so that the transmission is self-lubricating and requires very little maintenance.

The bearing surface 42 on either side of the placement groove 44 on the pin deflection cam 32 provides positive detent positioning of the cam shaft 40, which aids in both holding the latter in position and providing feedback. Feedback is provided to the rider through the gear selector lever, which indicates if the transmission is engaged in an appropriate gear. A pair of parallel guide structures on the pin deflection cam 32 ensures that the latter travels in a linear and a parallel manner to the axis of the deflection cam cradle 36. This action prohibits binding and jammed components, thus ensuring a trouble-free operation.

The two circular bearing surfaces 45, support the cam shaft 40. A series of seven nodes 38 are equally spaced along its axis. These nodes 38 are numbered two through eight since the first gear pins are always engaged. If no nodes are being utilized, the transmission defaults to the first, i.e., the lowest, gear.

Nodes 38 numbered 2-8 are visible from the circular bearing surface 42. Each node 38 is offset by a displacement angle A, which approximates 45° for seven nodes. Generally, the displacement angle A is calculated by the following equation:

$$A = \frac{360}{(n+1)}$$

The character "n" equals the number of nodes, which is also equal one less the number of speed transmission.

As the rotating shaft 40 places a node 38 into the vertical position, the deflection cam 32 depresses approximately ⅛-inch.

This depression deflects the mushroom-head pins 22 downward by a same distance to enable the pins to be captured below the drive ramp 31 and installed into the drive position. As the deflection cam 32 moves downward, the lift ramp 30 rises by a same distance; the pins 22 that were installed in the drive position now pass below the pick-up point and stay in that position until the next gearing occurs. When a new gear ratio selection is made, the rotating cam releases and raises the deflection cam 32 from the drive position. The lift ramp 30 drops down into the pin capture position as the previous gearing pins are withdrawn; simultaneously, the new gearing pins 22 are installed.

The innermost ring path is identified as the constant, minimum, lowest gear. A series of incoming mushroom-shaped pins 22 travel along the path to enter the shifting zone. These pins 22 are urged either to a neutral position by the lift ramp or to an extended, drive position by an appropriate drive ramp 30. The corresponding mushroom-shaped pins 22 are routed above or below the drive ramp 30, thus causing one ring to extend while the other six remain retracted. During a shifting cycle, another row of outgoing mushroom-shaped pins 22 extend while the previously extended ring retracts. This construction provides for a complete shifting process within one revolution of the transmission 10. The disc assembly 12 is completely contained in an enclosure (not shown) to prevent any debris from entering and jamming the mechanics.

2. Operation of the Preferred Embodiment

The preferred embodiment of the present invention is used in a simple and transparent manner compared to conventional mechanical transmissions on multiple-speed bicycles. The variable transmission is constructed of two separate disc systems: a front system having eight rings of proportionally spaced holes and the corresponding mushroom-headed pins attached to a pedal crank; and, a rear disc system having three rings of proportionally spaced holes and corresponding mushroom-head pins attached to a rear drive wheel. The two separate disc systems provide distinct gear rations when taken together, but they can be varied dependent on bicycle design and functionality.

When the gear is changed, the chain is either lifted or dropped in a single plane as the mushroom-headed pins extend or retract into the chain retention cavity slot; hence, the chain stays in a constant plane with respect to the disc systems. This is a contrast to the side-to-side movement of existing conventional derailleur technology. The chain stays engaged with the previous ring of pins as a petal turns and engages a new ring of pins. The ring which is engaged is dependent upon up-shifting or down-shifting. This construction provides not only for a very smooth and quiet shift, it also eliminates occurrences of chain slippage. The chain captures in the chain retention cavity slot which renders it impossible for the chain to jump off the pins and fall out of the gear. This action allows for continued pedaling, or application of power, throughout the ratio change period; hence, there is no need for clutches, freewheeling, backpedaling, or the like.

The foregoing description of specific embodiments of the present invention is presented for purposes of illustration and description. It is intended neither to be exhaustive nor to limit the invention to the precise forms disclosed and, obviously, many modifications and variations are possible in light of the above teaching. Embodiments are chosen and described in order to best explain principles of the invention and its practical application, to thereby enable others skilled in the art to best utilize the invention and various embodiments with various modifications as are suited to a particular contemplated use. It is intended that a scope of the invention be defined by the claims appended hereto and to their equivalents. Therefore, the scope of this invention is limited only to the following claims:

What is claimed is:

1. A variable speed transmission, comprising:
   a front disc system and a rear disc system interconnected by a chain, said chain engages an outermost ring of holes on both said front and said rear disc systems;
   a shifting zone;
   wherein each of said front and said rear disc systems comprise:
   a retention disc at an outermost side;
   a pin receiving disc at an innermost side; and,
   a pin holding disc sandwiched therebetween, said pin holding disc is fastened to said pin receiving disc.

2. The variable speed transmission of claim 1, wherein said front disc system consists of three concentric rings of proportionally spaced holes, wherein said rear disc system consists of eight concentric rings of proportionally spaced holes, one concentric ring corresponds to one preselected gear ratio.

3. The variable speed transmission of claim 2, wherein said proportionally spaced holes are capable of holding mushroom-headed pins.

4. The variable speed transmission of claim 2, wherein an innermost of said concentric rings is permanently deployed using barrel shaped pins, said barrel shaped pins are permanently inserted in corresponding innermost ring holes on said pin receiving disc.

5. The variable speed transmission of claim 2, wherein each of said concentric rings comprise a greater number holes than an inner ring before it so that proportional spacing is maintained.

6. The variable speed transmission of claim 3, wherein said mushroom-head pin is stored in said retention disc until it is manipulated and installed into a drive position by a cam assembly and a ramp apparatus.

7. The variable speed transmission of claim 6, wherein said cam assembly and said ramp apparatus are between said retention disc and said pin holding disc.

8. The variable speed transmission of claim 6, further comprising a helical lift ramp that individually secures a head of each said mushroom head pins as said receiving and said holding disc rotate.

9. The variable speed transmission of claim 8, further comprising:
   a generally rectangular deflection cam cradle:
   pin deflection cams resting in a series of seven parallel slots;
   a cam shaft located over and in a perpendicular arrangement to said pin deflection cam, said shaft selects one of said seven pin deflection cams to depress; and,
   seven engagement nodes, one of said engaged nodes rides along a pair of bearing surfaces comprised on said pin deflection cams.

10. The variable speed transmission of claim 9, wherein said nodes rest in a placement groove at a mid-point of a bearing surface, wherein a first travel direction allows for motion in both circular directions to permit both upwards and downwards shifting.

11. The variable speed transmission of claim 10, wherein an action of said cam shaft against said pin deflection cam causes a latter to move downward.

12. The variable transmission of claim 10, wherein said series of seven pin deflection cams rest upon said retaining nodule and the return spring.

13. The variable speed transmission of claim 9, wherein a pair of return springs returns each said pin deflection cam to a retracted position when the former is not engaged.

14. The variable speed transmission of claim 9, wherein a cam assembly cover provides physical protection for moving interior components of said cam assembly.

15. The variable speed transmission of claim 9, wherein said deflection cams have a ledge alone a bottom edge to insure said pins stay in the neutral position as they cross a gap over said shifting zone, wherein said ledge drops when said deflection cams lower into said drive position to enable enough clearance for said pins to pass between said ledge and a leading edge of a drive ramp.

16. The variable transmission of claim 15, wherein as said rotating cam places one of said series of seven nodes into a vertical position, said deflection cam depresses approximately ⅛-inch, said depression deflects said mushroom-head pins downward by a same distance to enable said pins to be captured below said drive ramp and be installed into a drive position.

17. The variable transmission of claim 15, wherein a series of said incoming mushroom-shaped pins enter the shifting zone and are urged either to a neutral position by said lift ramp or to an extended, drive position by said appropriate drive ramp, said corresponding mushroom-shaped pins are routed above or below said drive ramp, thus causing one of said concentric rings to extend while the other six remain retracted.

18. The variable transmission of claim 16, wherein downward movement of said deflection cam causes said lift ramp to rise by a same distance, wherein said pins that were installed in said drive position now pass below a pick-up point and stay in that position until a next gearing occurs.

19. The variable speed transmission of claim 9, wherein said deflection cam cradle rests within said retention disc, a cam assembly cover holds it captive, which is attached to said retention disc around its perimeter.

20. The variable transmission of claim 9, wherein said cam shaft is installed over said series of seven pin deflection cams and rests upon their outward axial end, said cam assembly installs over an outward side to allow said series of pin deflection cams to protrude through said retention disc and said ramp apparatus.

21. The variable transmission of claim 9, wherein said cam shall is supported by two circular bearing surfaces.

22. The variable transmission of claim 9, wherein said series of seven nodes are equally spaced along said cam shaft, each of said series of seven nodes is offset by an approximates 45° displacement angle.

23. The variable speed transmission of claim 1, wherein said retention disc is static.

24. The variable speed transmission of claim 1, further comprising a cavity retention slot is formed between said pin holding disc and said pin receiving disc to prohibit a disengagement of said chain.

25. The variable speed transmission of claim wherein said retention disc comprises a series of retention T-rings so that retained mushroom head pins can traverse through it.

* * * * *